United States Patent [19]
Sakurai

[11] 3,875,906
[45] Apr. 8, 1975

[54] HEATED INTAKE FOR AUXILIARY CHAMBER OF INTERNAL COMBUSTION ENGINE

[75] Inventor: Yoshitoshi Sakurai, Kawasaki, Japan

[73] Assignee: Honda Giken Kogyo Kabushiki Kaisha, Tokyo, Japan

[22] Filed: Apr. 27, 1973

[21] Appl. No.: 355,148

[30] Foreign Application Priority Data
June 22, 1972 Japan............................... 47-73932

[52] U.S. Cl......... 123/32 R; 123/32 ST; 123/193 H; 123/32 C
[51] Int. Cl....................... F02b 19/10; F02b 19/16
[58] Field of Search ............. 123/32 ST, 32, 122 A, 123/122 AA, 122 AB, 32 C, 193 H

[56] References Cited
UNITED STATES PATENTS
2,435,659 2/1948 Summers........................ 123/32 ST
3,543,736 12/1970 Suzuki............................ 123/32 ST
3,648,674 3/1972 Proctor........................... 123/32 ST Primary Examiner—Charles J. Myhre
Assistant Examiner—Ronald B. Cox
Attorney, Agent, or Firm—Lyon and Lyon

[57] ABSTRACT

Each cylinder of an internal combustion engine is provided with a main combustion chamber and an auxiliary combustion chamber connected by a torch nozzle. A rich mixture is heated before entering into the auxiliary chamber where it is ignited by a spark plug to project a flame through the torch nozzle to ignite a lean mixture in the main combustion chamber. The heating of the rich intake mixture may be accomplished by utilizing heat from the engine exhaust system, and a liner pipe insulated from the water cooled cylinder head carries the rich mixture to the auxiliary chamber to minimize condensation of fuel.

3 Claims, 1 Drawing Figure

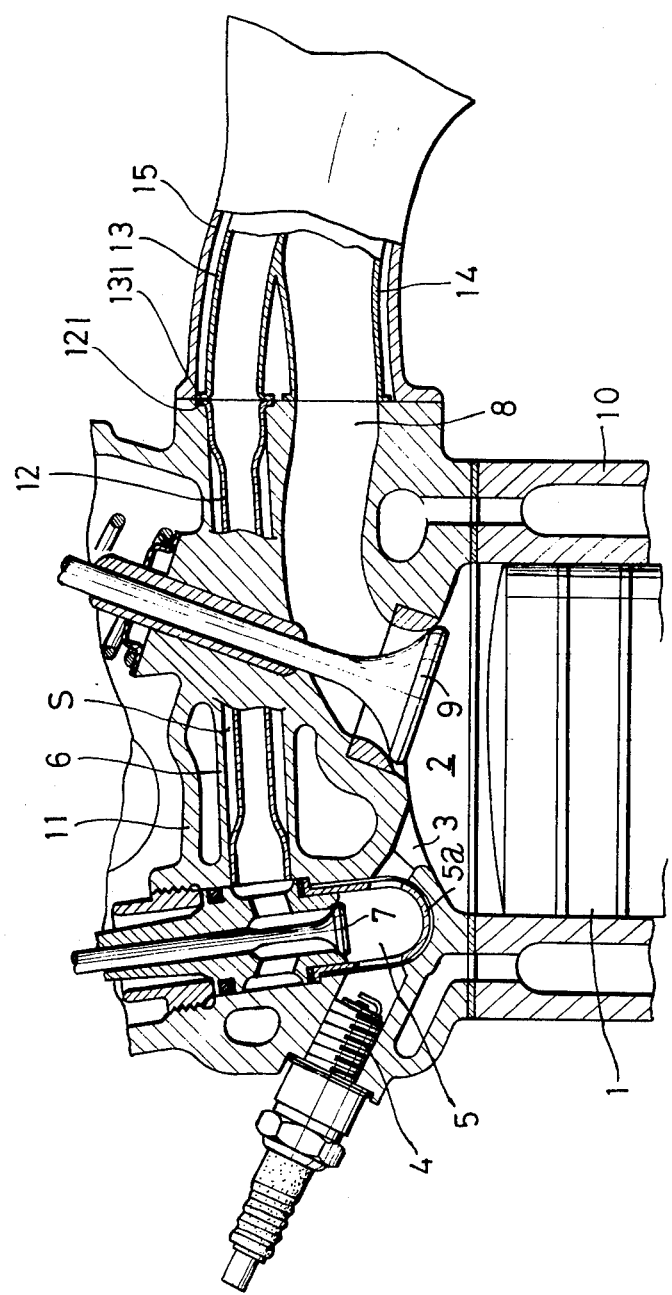

HEATED INTAKE FOR AUXILIARY CHAMBER OF INTERNAL COMBUSTION ENGINE

This invention relates to internal combustion engines of the type in which each cylinder has a main combustion chamber and an auxiliary combustion chamber connected by a torch nozzle. The moving piston forms one wall of the main combustion chamber. A rich mixture is supplied to the auxiliary chamber where it is ignited by a spark plug, causing a blast of flame to pass through the torch nozzle to ignite a relatively lean mixture in the main combustion chamber. It is important that the rich mixture which is introduced into the auxiliary chamber be fully vaporized in order to obtain optimum combustion. However, the cylinder head of the engine which carries the auxiliary intake passage to the auxiliary chamber is commonly cooled by water passages. Accordingly, condensation of fuel may occur on the relatively cool walls of the auxiliary inlet passage even though the rich mixture is initially heated so as to be fully vaporized.

In accordance with this invention, means are provided to heat the rich mixture so that it is fully vaporized, and additional means are provided to prevent condensation of fuel from said mixture as it passes through the auxiliary intake passage into the auxiliary chamber. In a preferred form of the invention, a metallic liner pipe is placed within the auxiliary intake passage in the cylinder head of the engine and is thermally insulated therefrom. The insulation may be provided by the space between the liner pipe and the auxiliary passage, or this space may be filled with insulating material.

Other and more detailed objects and advantages will appear hereinafter.

The drawing is a sectional elevation showing a preferred form of the invention.

Referring to the drawing, each cylinder of the engine has a piston 1 which forms one wall of a main combustion chamber 2. A torch nozzle 3 connects the main chamber 2 with the auxiliary chamber 5. A lean combustible mixture is admitted into the main combustion chamber 2 through a valved passage, not shown, and a rich combustible mixture is admitted through valve 7 into the auxiliary chamber 5. The rich mixture in the auxiliary chamber 5 is ignited by the spark plug 4, and a blast of flame then passes through the torch nozzle 3 to ignite the lean mixture in the main combustion chamber 2.

THe engine block 10 and the cylinder head 11 are both formed with water cooling passages. Accordingly, the walls of the auxiliary inlet passage 6 may cause condensation of fuel thereon as the rich mixture passes through the auxiliary inlet passage 6 in the cylinder head 11, and then past the auxiliary inlet valve 7 into the auxiliary chamber 5. To prevent this unwanted condensation of fuel, a liner pipe 12, insulated for the major portion of its length with respect to the water cooled cylinder head 11, is installed within the auxiliary inlet passage 6. The rich mixture passing through the interior of the metal liner pipe 12 is thus insulated from the cooling effect of the water passages in the cylinder head 11. The insulation may result from the space S between the liner pipe 12 and the walls of the auxiliary passage 6, or this space S may be filled with insulating material. A metallic liner 5a may be installed within the auxiliary chamber 5 and is provided with apertures communicating with the spark plug 4 of the torch nozzle 3.

Exhaust from the main combustion chamber 2 is controlled by the exhaust valve 9 and passes through the exhaust passage 8 and liner pipe 14. Heat exchange between the hot gases in the liner pipe 14 and the rich inlet mixture in the liner pipe 13 heats the rich mixture to maintain the fuel fully vaporized. The liner pipe 13 terminates in a flange 131 which mates with flange 121 on one end of the liner pipe 12. The liner pipes 12, 13 and 14 are formed of metal of low thermal capacity, and they are enclosed within an outer tube 15 high in rigidity.

It is recognized that instead of heating the rich intake mixture by heat exchange with the exhaust gases, the liner pipe 13 could be heated by other heating means, such as an electric heater, not shown.

Having fully described my invention, it is to be understood that I am not to be limited to the details herein set forth but that my invention is of the full scope of the appended claims.

I claim:

1. In an internal combustion engine, the combination of: walls including a movable piston forming a main combustion chamber, walls forming an auxiliary combustion chamber, a torch nozzle establishing communication between said chambers, means for supplying a rich mixture to the auxiliary combustion chamber, said means including an auxiliary intake passage having water cooled walls, said means also including a metallic liner pipe extending through said auxiliary intake passage and spaced from said walls, a spark plug for igniting the rich mixture in the auxiliary combustion chamber, and means for heating the rich mixture prior to its passage through said metallic liner pipe.

2. The combustion set forth in claim 1 in which the rich mixture is heated from exhaust gases passing from said main combustion chamber.

3. In an internal combustion engine, the combination of: walls including a movable piston forming a main combustion chamber, a valve-controlled exhaust passage communicating with said main combustion chamber, walls forming an auxiliary combustion chamber, a torch nozzle establishing communication between said chambers, means for supplying a rich mixture to the auxiliary combustion chamber, said means including an auxiliary intake passage having water cooled walls, said means also including a metallic liner pipe extending through said passage and insulated from said walls, and means for heating the rich mixture from exhaust gases in said exhaust passage prior to passage of the rich mixture through said metallic liner pipe.

* * * * *